No. 892,308. PATENTED JUNE 30, 1908.
J. F. RUDE & J. W. SMITH.
MANURE SPREADER.
APPLICATION FILED OCT. 28, 1907.

WITNESSES,

John F. Rude and
John W. Smith, INVENTORS.

By Robert S. Carr. Atty.

UNITED STATES PATENT OFFICE.

JOHN F. RUDE AND JOHN W. SMITH, OF LIBERTY, INDIANA, ASSIGNORS TO THE RUDE BROTHERS MANUFACTURING COMPANY, OF LIBERTY, INDIANA, A CORPORATION OF INDIANA.

MANURE-SPREADER.

No. 892,308.     Specification of Letters Patent.     Patented June 30, 1908.

Application filed October 28, 1907. Serial No. 399,451.

To all whom it may concern:

Be it known that we, JOHN F. RUDE and JOHN W. SMITH, citizens of the United States, residing at Liberty, Union county, Indiana, have invented a new and useful Improvement in Manure-Spreaders, of which the following is a specification.

Our invention relates to manure spreaders of the class wherein the material is distributed from a wagon by means of a rotating toothed cylinder, and the objects of our improvement are to provide a distributing cylinder or beater with a series of alternating rows of teeth which are angularly disposed toward its ends and which overlap each other at their adjacent ends; to provide means for moving the center of the load laterally and toward the ends of the beater for distributing it more evenly; to provide means for preventing the material from being delivered in bunches; to provide means for finely graduating the movement of the feeding carrier through a wide range of speeds; to provide means for adjusting the throw of the pawls both independently and simultaneously and to provide simple and durable construction of parts together with facility of operation and efficiency of action. These objects are attained in the following described manner as illustrated in the accompanying drawings, in which:—

Figure 1:
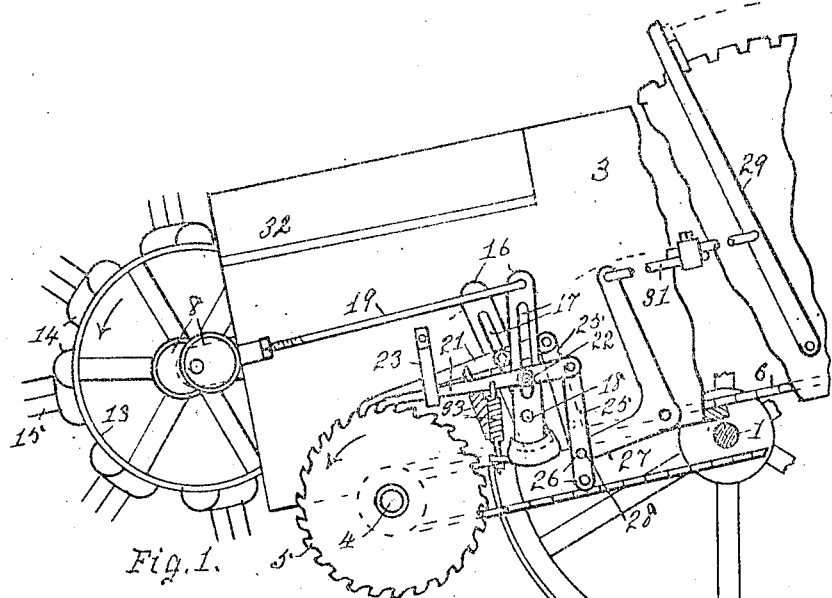
Figure 2:
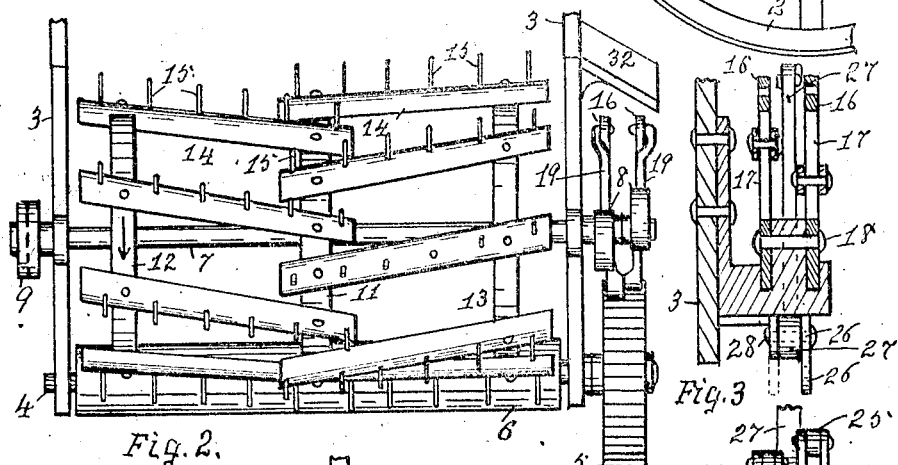
Figure 3:
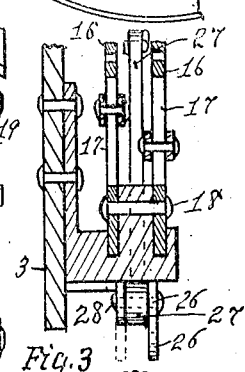
Figure 5:
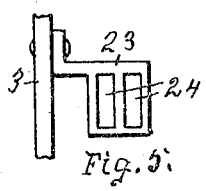
Figure 4:
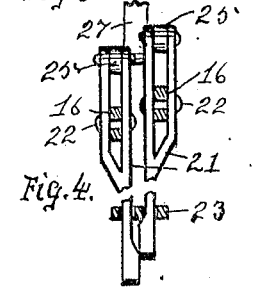

Figure 1 is a side elevation with parts broken away of a manure spreader embodying our improvements; Fig. 2, a rear elevation; Fig. 3, a sectional view extended longitudinally through the slotted arms of the pawl and ratchet mechanism; Fig. 4, a plan of the pawls with parts in section, and Fig. 5, an elevation of the bracket guide for the pawls.

In the drawings, 1 represents the rear axle, 2 the traction wheels, 3 the body, 4 the carrier shaft, 5 the ratchet wheel thereon, and 6 the carrier, all constructed and arranged in the ordinary manner. The beater shaft 7 journaled on the rear end of the body is provided at one end with oppositely disposed eccentrics 8 and at the other end with a sprocket wheel 9 which communicates with the axle in the usual manner by means of a chain (not shown). Said shaft is also provided with a webbed head 11 at its middle point and with similar heads 12 and 13 near its respective ends.

The beater slats are formed in two sets, one set connected to each outer head 12 and and 13 and alternately connected to the inner head 11; these slats incline from the outer to the inner head forwardly in the direction of rotation so that their inner ends when approaching the load on the under side of the beater are in advance and when on the upper side of the beater are in the rear of the outer ends.

The inner ends of the adjacent slats are extended a short distance beyond each other and also beyond the middle head 11, said slats are preferably formed with a convex outer surface and they are each provided with a series of pins 15 which project therefrom on both sides of the middle head whereby the number of pins in the middle zone of the beater are doubled for facilitating the spreading of the middle portion of the load which is usually the thickest.

Similar arms 16 each provided with a slot 17 are mounted to oscillate on a pivot 18 which is secured at a fixed point on the side of the body and in front of the ratchet wheel 5. The eccentrics 8 are connected with the ends of the respective arms by means of adjustable eccentric rods 19. Similar bifurcated pawls 21 straddle the respective arms 16 and are connected thereto by means of pins or bolts 22 which are movable in the slots 17. A bracket guide 23 secured to the body is formed with slots 24 through which the pawls are movably extended for maintaining them in proper lateral position on the face of the ratchet wheel 5, where they are yieldingly maintained by means of springs 33. Links 25 pivotally connected at one end with the heels of the respective pawls are provided with a series of holes 26 at the other end whereby they are independently adjustable on the bell crank 27 by means of a bolt 28. Said lever is fulcrumed on the side of the wagon body and connected with a detent lever 29 by means of an adjustable rod 31. A projecting board 32 secured to the side of the body serves as a hood over the pawl and ratchet mechanism to protect it from dirt.

In operation, by reason of the slats of the beater being alternately and also angularly disposed from the center toward its ends in such manner that the rotation of the beater carries their adjacent ends in advance of their opposite ends through a fixed axial plane of the beater, a more even and uniform distribution of the material is obtained. This arrangement of the slats distributes the resistance evenly instead of intermittently to the power which actuates the beater. The extending of the series of pins in each slat beyond the center of the beater doubles the number of pins in the intermediate zone thereof where the load is usually the deepest on account of being heaped. The disposition of the slats in retreating helical lines to its direction of rotation and toward the ends of the beater tends to distribute the thicker middle portion of the load laterally toward the ends of the beater.

The pawls may be independently adjusted on the bell crank lever by means of the links, that they may be moved or thrown either the same or different distances as desired by the oscillating arms. The detent lever serves to move the pawls simultaneously to more or less throw in any position of adjustment in relation to each other. The pawls may be so adjusted that the one with the longest throw will move the ratchet wheel one notch at a time while the other pawl will remain substantially inoperative. By increasing the throw of both pawls simultaneously when adjusted in this manner the one with the shortest throw will move the ratchet wheel one notch and the other will move it two notches thus making the combined action of the pawls three notches. By further similar movement they will move the ratchet wheel five or other odd number of notches. When they are adjusted to move equal distances they will move the ratchet wheel either two or other even number of notches. The finely graduated movement of the ratchet wheel thus obtained is very desirable for changing the speed of the feeding carrier to correspond to the different stages in the discharge of the load.

Having fully described our improvement what we claim as our invention and desire to secure by Letters Patent of the United States is:—

1. In a manure spreader, a beater comprising a shaft, heads thereon, slats secured to the heads and extending alternately from the ends to points beyond the middle line of the beater.

2. A manure spreader comprising a beater provided with rows of teeth projecting therefrom in alternating lines from its respective opposite ends to points beyond the center thereof.

3. In a manure spreader, a beater comprising peripheral slats alternately disposed with overlapping adjacent ends and inclined in opposite directions respectively in a rearward direction to the direction of rotation of the beater.

4. In a manure spreader, the combination of a ratchet wheel, slotted arms fulcrumed at a fixed point, means for oscillating them in respective opposite directions simultaneously, pawls carried by the respective arms and engaging with the wheel, and means for independently adjusting the pawls on the arms.

5. A manure spreader comprising a ratchet wheel, arms pivotally mounted at a fixed point, pawls independently adjustable on the arms, hand actuated lever mechanism for adjusting the pawls simultaneously on the arms, and means for oscillating the arms with the pawls into alternate engagement with the wheel.

6. In a manure spreader, the combination of a beater provided with oppositely disposed eccentrics, arms respectively oscillated thereby, a ratchet wheel, a carrier actuated thereby, pawls coacting with the ratchet wheel and movable with the arms, means for independently adjusting the pawls on the arms, and means for simultaneously changing the movement of the pawls.

7. A manure spreader comprising a ratchet wheel, arms pivotally mounted at a fixed point, pawls coacting with the wheel and independently adjustable on the respective arms, means for oscillating the arms alternately in opposite directions, and means for yieldingly maintaining the pawls in engagement with the wheel.

8. In a manure spreader, a beater provided with radially projecting teeth, said teeth being disposed in alternating rows which overlap at their adjacent ends and are extended in respective opposite directions at a rearward slant to the direction of rotation of the beater.

In testimony whereof witness our signatures at Liberty Indiana, this 25th day of October, 1907.

J. F. RUDE.
JOHN W. SMITH.

In presence of—
H. DARR,
R. S. CARR.